United States Patent [19]
Saito

[11] 3,809,890
[45] May 7, 1974

[54] CAMERA FINDER

[75] Inventor: Kaneo Saito, Tokyo, Japan

[73] Assignee: Konishiroku Photo Industry Co., Ltd., Tokyo, Japan

[22] Filed: Apr. 13, 1972

[21] Appl. No.: 243,785

[30] Foreign Application Priority Data
Apr. 14, 1971 Japan............................ 46-27883

[52] U.S. Cl............................ 250/214 P, 95/10 C
[51] Int. Cl........................................... H01j 39/12
[58] Field of Search ........ 250/215, 214 P; 95/10 R, 95/10 B, 10 C, 10 CT, 10 CE, 10 CD, 42

[56] References Cited
UNITED STATES PATENTS

| | | | |
|---|---|---|---|
| 3,641,892 | 2/1972 | Strehle | 95/10 C |
| 3,498,193 | 3/1970 | Shimomura | 95/10 C |
| 3,515,045 | 6/1970 | Uno | 95/10 C |
| 3,461,783 | 8/1969 | Fujii | 95/10 C |
| 3,087,379 | 4/1963 | Rogers | 95/10 C |
| 3,636,839 | 1/1972 | Yamamoto | 95/10 C |
| 3,347,143 | 10/1967 | Jacobs | 95/42 |
| 3,478,663 | 11/1969 | Tsuruoka | 95/42 |
| 3,465,660 | 9/1969 | Trankner | 95/42 |

Primary Examiner—Archie R. Borchelt
Assistant Examiner—D. C. Nelms
Attorney, Agent, or Firm—Bierman & Bierman

[57] ABSTRACT

A novel camera assembly of the type comprising light receiving photoelectric means and a removable finder is provided. The light receiving means includes compensating means and other parts of a photometric device, all of which are mounted in the finder and removable from the camera. An ammeter and power supply for the light receiving photoelectric means is located in the camera body itself.

3 Claims, 1 Drawing Figure

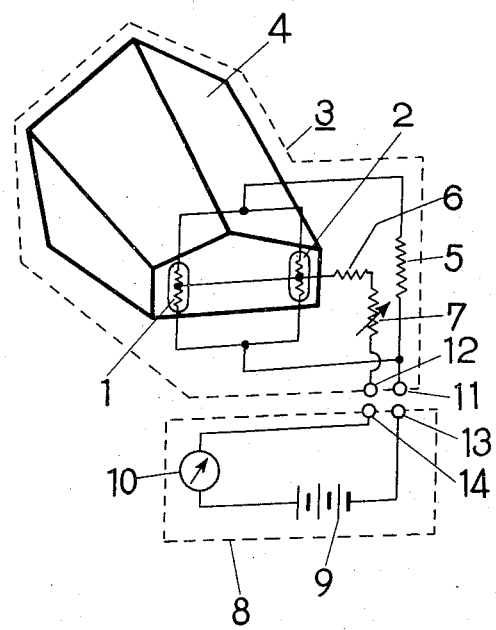

CAMERA FINDER

This invention relates to a camera assembly comprising a camera body and a finder detachably mounted on the camera body so as to be exchanged with other finder, said finder having light receiving photoelectric means which includes compensating means thereof and incorporating parts of a photometric device.

At present a through-the-lens photometric system is employed in almost all of the single reflex cameras. Various photometric systems have been developed, however, they are not always suitable for all objects to be photographed. Therefore, the cameras provided with both total average photometric system and partial photometric system have been proposed wherein change-over can be made from one system to the other depending on the object to be photographed, thereby reducing photometric error. Such cameras have also a disadvantage that the photometric device thereof becomes complex in structure and larger in size in order to effect photometry suited to all objects to be photographed. In single reflex cameras having a penta prism detachably mounted thereon, a system wherein only the penta prism can be exchanged with other penta prism or finder while light receiving photoelectric means, an ammeter and an ammeter actuating part remain within the camera body thereof is already proposed. However, the above-mentioned penta prism exchange system or light receiving photoelectric means change-over system has such a disadvantage that accurate photometry is impossible since exchange of the light receiving photoelectric means itself and change of the angle of light incident upon the photoelectric means can not be made.

The present invention has its object to eliminate the above-mentioned disadvantage in particular.

According to the present invention, arrangement is made such that an ammeter and an electric circuit for actuating the ammeter are located within the camera body, while light receiving photoelectric means and compensating means thereof are located within an exchangeable finder, each of said photoelectric means having an optimum light receiving angle depending on the arrangement of the finder and the purpose of photographing.

The present invention will now be more particularly described with reference to the accompanying drawing which shows one embodiment thereof.

Reference numerals 1, 2 denote light receiving photoelectric means located on part of penta prism 4 which is located within an exchangeable finder 3. Connected in series within the exchangeable finder 3 are compensating resistors 5, 6 and 7 for the light receiving photoelectric means. Resistor 6 is connected to the midpoints of photoelectric means 1 and 2. While, within camera body 8 as shown by dotted line, electric supply 9 and ammeter 10 are connected in series. Connecting terminals 11, 12 on the side of said light receiving elements and connecting terminals 13, 14 of ammeter 10 are detachably secured in positions respectively.

According to the present invention, an electric circuit for actuating ammeter 10 is located within camera body 8, while light receiving photoelectric means 1, 2 and compensating means such as compensating resistor for low and high brightness and compensating resistor for making brightness-electric current characteristics linear and/or compensating resistor for different light receiving angles are located within the exchangeable finder in such a manner that they can be exchanged as a single unit together with the finder. Therefore, it is possible to photograph an object under the best condition by using a finder which includes light receiving photoelectric means each having a light receiving angle most suited to the object. Further, when such exchangeable finder having light receiving photoelectric means and compensating means enclosed therein is connected to an electric shutter, more effective light exposure can be obtained.

According to the present invention, it is also possible to provide the light receiving photoelectric means in a finder used for sports, measure the light therein and connect the ammeter in the camera body with said light receiving photoelectric means.

What is claimed is:

1. A camera of the type having a camera body and a finder detachably mounted thereon, said finder comprising a light guide member, light receiving photoelectric means and compensating means for said photoelectric means; and means for connecting said photoelectric means and compensating means with an electric circuit arranged in the camera body, said finder being removable from said body.

2. A camera finder as claimed in claim 1 wherein said light guide member comprises a penta prism.

3. A camera assembly comprising a camera body and a finder detachably mounted on said body, a circuit in said body including an ammeter, a battery electrically connected in series to said ammeter; said finder comprising therewithin a light guide member and a light receiving photoelectric means and a compensating means for said photoelectric means, and means for electrically connecting said photoelectric means and compensating means thereof to the said circuit; all of the elements in said finder being detachable from the camera body along with said finder.

* * * * *